United States Patent [19]

Dicky

[11] Patent Number: 4,684,071
[45] Date of Patent: Aug. 4, 1987

[54] UNITIZED MACHINE FOR SHREDDING WASTE AUTOMOTIVE VEHICLE TIRES

[75] Inventor: John Dicky, North Tonawanda, N.Y.

[73] Assignee: Columbus McKinnon Corporation, Amherst, N.Y.

[21] Appl. No.: 789,426

[22] Filed: Oct. 21, 1985

[51] Int. Cl.⁴ ............................................. B02C 23/12
[52] U.S. Cl. ...................................... 241/80; 241/236; 241/DIG. 31
[58] Field of Search .................... 198/509, 703; 209/4, 209/3; 241/236, 101.7, 79, 80, 97, DIG. 38, DIG. 31, 224

[56] References Cited

U.S. PATENT DOCUMENTS 4,134,556  1/1979  Ehrlich et al. ......... 241/DIG. 31 X
4,479,581  10/1984  Keltman, Jr. .................... 241/236 X

*Primary Examiner*—Mark Rosenbaum
*Attorney, Agent, or Firm*—Bean, Kauffman & Bean

[57] ABSTRACT

A compactly unitized machine for shredding waste automotive vehicle tires or the like comprising a frame, a shredder, a shredded scrap receiving classifier, and an elevator for carrying oversized scraps rejected by the classfier back to the shredder; said frame, shredder, classifier and elevator are of such configurations and are so relatively arranged and supported upon said frame as to comprise a compactly unitized three-dimensionally minimally sized unit. The classifier per se is of improved construction and operating characteristics.

15 Claims, 7 Drawing Figures

4,684,071

UNITIZED MACHINE FOR SHREDDING WASTE AUTOMOTIVE VEHICLE TIRES

BACKGROUND AND OBJECTS OF THE INVENTION

This invention relates to apparatus for mechanically chopping, shearing or shredding solid materials such as scrap automobile and truck tires; scrap insulated electrical conductors; scrap railroad ties; beverage cans; and other solid waste materials required to be reduced to substantially uniform smaller particulate sizes for efficient permanent disposal, commercial recycling, or other utilization. Typically, systems for such purposes include conveyor means for carrying materials to be processed from ground level to the in-feed of a chopper or shredding machine (which for convenience will hereinafter be referred to as the shredder); a screening (or "classifying") device for receiving the produce from the shredder and passing to discharge product fragments of prescribed sizes; and elevator means for returning oversized products to the shredder mechanism. Machines for similar purposes are disclosed for example in U.S. Pat. Nos. 3,578,252; 3,656,697; 3,727,850; 3,841,570; 3,931,935; 4,134,556; 4,156,508; 4,216,916 and 4,363,450.

Stockpiled waste items of the type referred to typically comprise components, some of which are relatively soft but resilient, and some of which are relatively strong and resilient. Other parts may be brittle, and still others soft and non-resilient. Thus, the products discharged by the shredder typically comprise a heterogeneous mix of relatively large sized curvilinear or concave shaped resilient pieces and relatively small sized solid particulates. The mass "flow" characteristics of such mixtures are quite different from the flow patterns of homogeneous mixtures, and this is especially true when the components of the heterogeneous mix are of different specific gravities.

It is the primary object of the present invention to provide in compact unitized form a machine embodying in improved manner all of the above mentioned essential operative components, so as to be readily movable (such as on skids or wheels) from one operative site to another. Another object is to provide in a machine as aforesaid an improved shredded product classification system employing one or more separately competent screening units of unique construction arranged in vertically stacked relation; each unit being readily removable/replaceable and embodying per se important improvement construction features.

DESCRIPTION OF THE PREFERRED EMBODIMENTS

General

Figure 1:
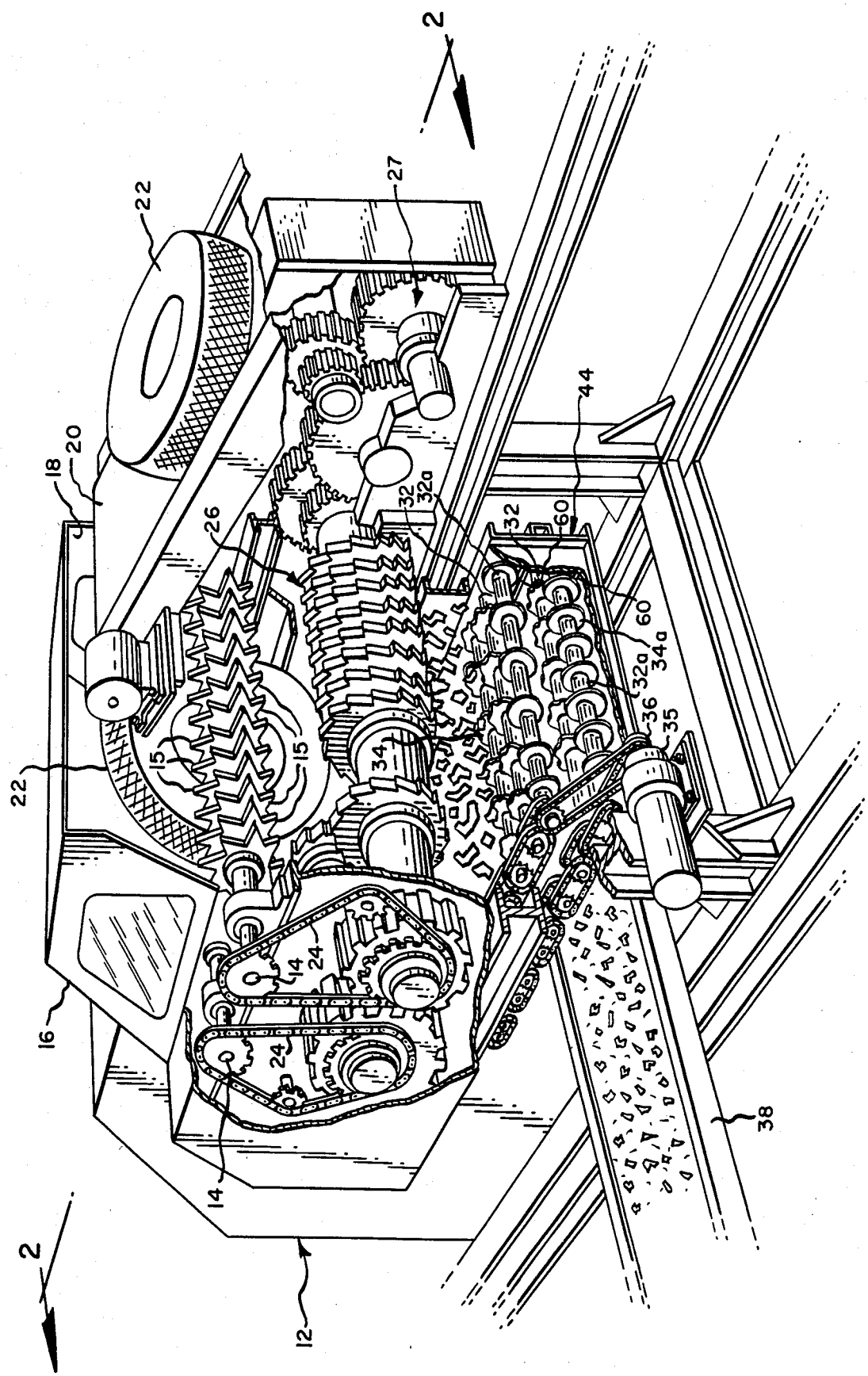
FIG. 1 is a cut-away perspective view of a machine embodying the present invention, showing the relative arrangement of major components thereof.

As shown by way of example herein, the invention may be embodied in a machine comprising a frame designated generally by the numeral 12 which houses at an upper level thereof a pair of parallel disposed in-feed drive shafts 14, 14, each of which carries in keyed relation thereon a plurality of sprockets or "star" wheels 15. A hood 16 surmounts the in-feed rollers and is open at one side as shown at 18 to permit an in-feed conveyor 20 to discharge materials to be processed (such as a scrap automobile tire 22) downwardly and in-between the feed wheels 15. The shafts 14, 14 are driven by means of drive chains 24 to rotate in opposite directions so as to grip upon and drag down therebetween the objects to be shredded, which are thereby punched down into the shredder rolls which are designated generally by the numerals 26, 26 and which are shown as being driven to rotate in opposite directions by means of a motorized gear system 27 (FIG. 1). It is to be understood that the shredding mechanism may be of any suitable type, but is shown herein by way of example to be of the type shown in the earlier patents referred to hereinabove.

Figure 2:
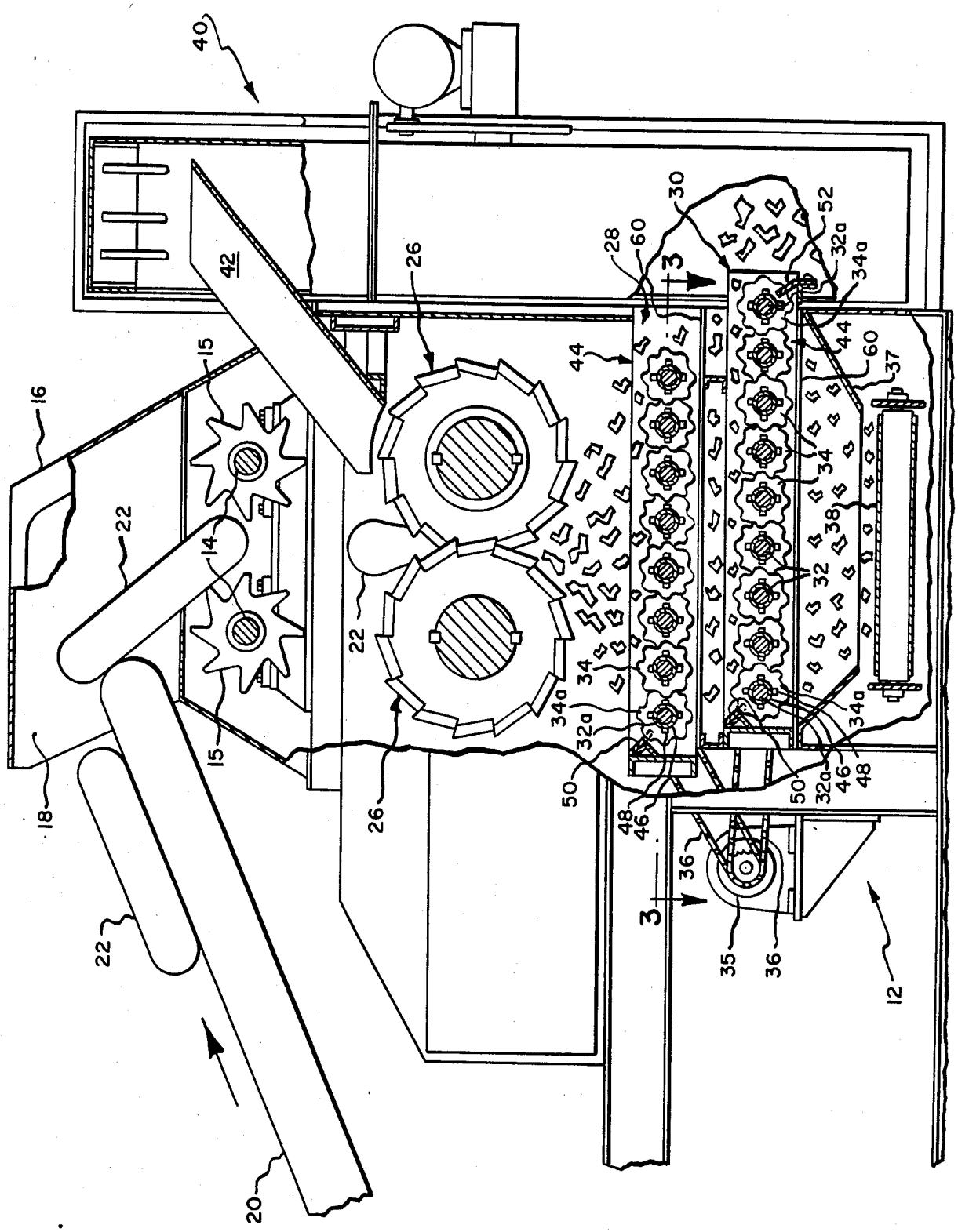
FIG. 2 is a longitudinally parti-sectional and elevational view on enlarged scale of the machine of FIG. 1.

The shredded materials fall by gravity from the shredding mechanism into the classifier compartment of the machine which is illustrated herein as being occupied by way of example by a pair of classifying units designated generally by the numerals 28 and 30 (FIG. 2). As will be explained more fully hereinafter, each such classifier unit comprises a gang of parallel disposed shafts 32 carrying discs 34; the shafts 32 being driven to rotate in clockwise direction as viewed in FIG. 2 such as by a motor 35 and chain and sprocket system 36, and shredded materials of designated particle sizes fall therethrough onto a chute 37 leading as to a product take-away conveyor 38. Oversize particles remaining on top of the classifier units drift transversely thereof and then fall by gravity into a return elevator such as is shown herein by way of example at 40 (FIG. 2) to be of the rotary drum type. The oversize scrap remnants are thereby elevated and then delivered such as by means of a gravity chute 42 back into the shredder mechanism for reprocessing.

The Classifying System

Figure 3:
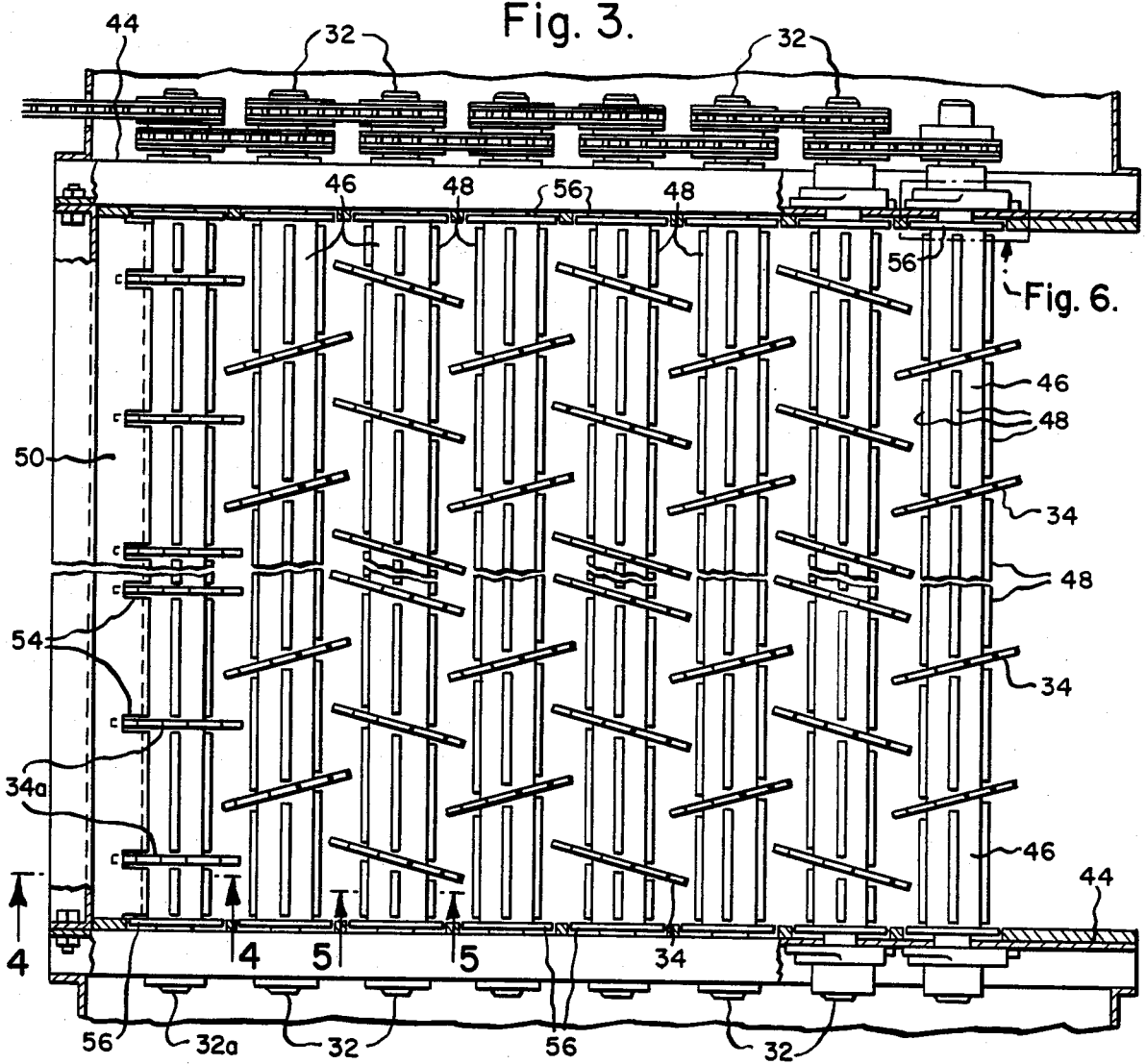
FIG. 3 is a sectional view on enlarged scale taken as along line 3—3 of FIG. 2.
Figure 4:
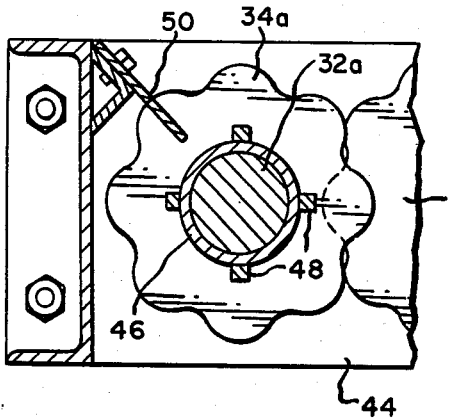
FIGS. 4 and 5 are fragmentary sectional views on a further enlarged scale, taken as along lines 4—4 and 5—5, respectively, of FIG. 3.
Figure 5:
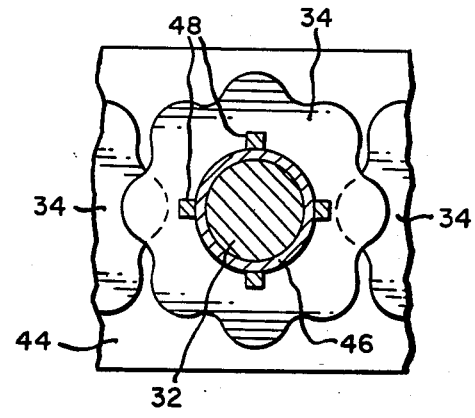

The product sizing or "classifying" system of the present invention differs importantly from classifier mechanisms for similar purposes such as are shown for example in the prior art patents above referred to. In the case of the present invention, either one or more individually competent and separate "units" may be employed in the form of a vertical "stack" of such units which are operated to progressively limit the sizes of particles descending therethrough. However, as best shown at FIGS. 1 and 2 by way of example herein, a pair of units are employed, and as best shown at FIGS. 2–5, each unit comprises a vertically open frame 44 mounting a plurality of parallel disposed drive shafts 32. These shafts may be of solid bar form, or may as shown herein comprise tubular shafts 46 from opposite ends of which stub shaft 32 extends. In any case, these shafts carry in spaced apart keyed relation thereon series of discs 34; and the spaces on the shafts between the discs are occupied by radially extending ribs 48. The discs 34 of adjacent shafts in each unit mesh in interdigitated relation, and thus as shown at FIG. 3 in plan view the unit provides openings between the discs 34 and the shafts 46 and the bars 48 through which reduced size particulates may fall.

It is a particular feature of the present invention that the discs 34 which are carried by those shafts 32 which are intermediate to the outside shafts (which are designated 32a) are canted relative to the axes of rotation of the shafts 32; and that the discs on adjacent shafts are canted in opposite directions, whereas the discs designated 34a on shafts 32a at the ends of the unit frame are carried thereon so as to extend radially therefrom. All of the shafts of each unit are driven to rotate in the same direction. The canted discs operate to agitate and shuffle in improved manner the material falling thereon from the shredder mechanism, and thus, the material which is of unique mass flow characteristics (as explained hereinabove) is thereby subjected to a unique shuffling process which markedly increases the efficiency of the screening operation. Incidental to this, oversize particulates are shifted laterally on top of the unit and discharged into the oversize return elevator 40. Also, note that the discs 34 are peripherally scalloped, whereby they jolt the material as they rotate and therefore operate with further increased efficiency during the material screening process.

The drive shafts 32a carry their discs 34a in uncanted radially extending relation, and baffle plates 50 are provided to funnel the incoming shredded material away from the end of the classifier unit and into the discs 34a. A baffle plate 52 is also provided in conjunction with the final oversize discharge disc 34a unit (FIG. 2) to prevent oversize particles from leaking back into the product discharge chute 36; and the baffle plates 50 and 52 are both notched as shown at 54 (FIG. 3) in order to make them more effective in operation.

Figure 6:
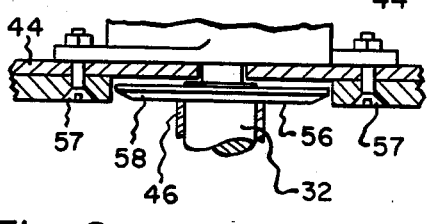
FIG. 6 is an enlarged sectional view of the area designated 6 of FIG. 3.
Figure 7:
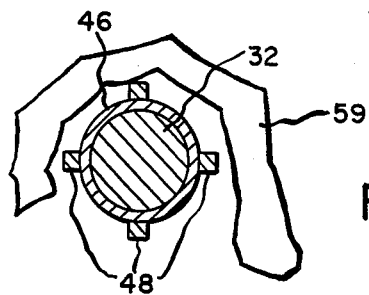
FIG. 7 is a schematic sectional view illustrating operation of one of the features of the invention.

As shown at FIGS. 3 and 6, the shafts 32 and 32a carry integrally therewith adjacent their exitings through the frame members 44 of the unit (but interiorly thereof) sealing discs 56 of smoothly circular peripheral configuration which cooperate with complementary shaped openings through plates 57 which are bolted or otherwise attached to the frame 44 as shown at 57 (FIG. 6). This prevents leakages of fine particulates through the side walls 44 of the unit. The discs 56 are beveled as shown at 58 (FIG. 6) to shunt loose materials away from the openings through the frame 44. The ribs 48 extending radially from the shafts assist importantly in shuffling the scrap materials when introduced to the classifier unit by way of preventing strap-shaped scraps from simply hanging on the sleeves 46 while the latter rotate thereunder. Thus, as depicted at FIG. 7, whenever a strap-shaped scrap piece 59 tends to ride in draped relation over a portion of the classifier unit, the ribs 48 pull against the scrap piece and move it along through the classifier.

Whereas the system is shown in FIGS. 1 and 2 to include a pair of separate classifying units or decks in vertically tandem relation, only one or any other number of units may be so employed, and the machine frame 12 will be provided with a suitable number of tracks such as are shown at 60 (FIGS. 1 and 2) upon which such units may be slid in and out of the machine. If two or more units are employed, the spacings between the discs 34 on their shafts 32 may be varied, whereby for example to permit larger particles to fall through the uppermost located unit. The upper unit will preferably be driven so as to rotate at somewhat lower speed than the lower situated units, and the speeds of rotation of the various units are preferably regulated so that all of the units are similarly loaded when the system is operating.

It is to be noted that the vertically stacked shredder and classifier and the elevator components of the machine are so relatively arranged and carried upon the frame structure in such manner as to comprise a compactly unitized and overall minimally sized unit, occupying the smallest possible volumetric space. Thus, it will be appreciated that the machine is readily movable such as on skids or wheels for servicing different stockpiled waste tire sites; and includes an improved "classifier" component of unique structural and operational characteristics for more efficiently shredding such specialized waste items as are referred to.

I claim:

1. A compactly unitized machine for shredding waste automotive vehicle tires and reducing to prescribed maximum sizes the remnants thereof, said machine including:
   a shredder mounted upon said machine at an upper level thereof for receiving and shredding tires when fed thereinto;
   a shredded scrap reciving classifier mounted on said machine beneath said shredder; and
   an elevator mounted on said machine for receiving oversize scraps of shredded materials from said classifier and returning said oversize scraps to said shredder for reprocessing, said classifier including:
   a vertically open rectangular-shaped frame having opposite side portions thereof formed to support and accommodate in freely rotatable relation the opposite ends of a plurality of parallel horizontally spaced apart drive shafts;
   pluralities of spaced apart discs mounted in fixed relation on each of said shafts; the discs on the shaft adjacent one end of said frame being mounted thereon to extend radially therefrom, while the discs on the others of said shafts are mounted thereon to extend in canted relation therefrom; and
   means for driving all of said shafts to rotate in the same direction so as to cause oversize scraps to ride on top of said discs and away from said one end of said frame for discharge over the opposite end of said frame into said elevator.

2. A machine as set forth in claim 1 wherein the discs carried by adjacent drive shafts extend in interdigitated manner therebetween.

3. A machine as set forth in claim 2 wherein a baffle plate is mounted on said one end of said frame to funnel incoming shredded material away from said end of the classifier unit and onto said discs.

4. A machine as set forth in claim 2 wherein a baffle plate is mounted on said opposite end of said frame to prevent leakage of oversize shredded material back into the flow of undersize shredded material onto said classifier.

5. A machine as set forth in claim 1 wherein axially elongated rib means extend radially from said drive shafts intermediately of said discs.

6. A machine as set forth in claim 1 wherein sealing discs are carried by said drive shafts interiorly of said frame preventing egress of materials through the rotating shaft supporting portions of said frame side portions.

7. A machine as set forth in claim 6 wherein said sealing discs are peripherally beveled.

8. A compactly unitized machine for shredding waste automotive vehicle tires and reducing to prescribed maximum sizes the remnants thereof, said machine including:
- a shredder mounted upon said machine at an upper level thereof for receiving and shredding tires when fed thereinto;
- a shredded scrap receiving classifier mounted on said machine beneath said shredder; and
- an elevator mounted on said machine for receiving oversize scraps of shredded materials from said classifier and returning said oversize scraps to said shredder for reprocessing; said classifier including the improvement comprising:
- a plurality of individually competent vertically open rectangular-shaped frame members mounted on said machine at vertically spaced apart superposed positions having the opposite side wall portions thereof provided with means to support and accommodate in freely rotatable relation the opposite ends of pluralities of parallel horizontally spaced apart drive shafts;
- pluralities of spaced apart discs mounted in fixed relation on each of said shafts; the discs on the shafts adjacent one end of said frames being mounted thereon to extend radially therefrom, while the discs on the others of said shafts are mounted thereon to extend in canted relation therefrom; and
- means for driving all of said shafts to rotate in the same direction so as to cause oversize scraps to ride on top of said discs and away from said one end of said frames for discharge over the opposite end of said frames into said elevator.

9. A machine as set forth in claim 8 wherein the discs carried by adjacent drive shafts extend in interdigitated manner therebetween.

10. A machine as set forth in claim 9 wherein a baffle plate is mounted on said one end of said frame to funnel incoming shredded material away from said end of the classifier unit and onto said discs.

11. A machine as set forth in claim 9 wherein a baffle plate is mounted on said opposite end of said frame to prevent leakage of oversize shredded material back into the flow of undersize shredded material onto said classifier.

12. A machine as set forth in claim 9 wherein the discs on adjacent others of said shafts are alternately canted in opposite directions away from axially thereto.

13. A machine as set forth in claim 8 wherein axially elongated rib means extend radially from said drive shafts intermediately of said discs.

14. A machine as set forth in claim 8 wherein sealing discs are carried by said drive shafts interiorly of said frame members preventing egress of materials through the rotating shaft supporting portions of said frame side walls.

15. A machine as set forth in claim 8 wherein said sealing discs are peripherally beveled.

* * * * *